United States Patent
Schremmer et al.

(10) Patent No.: US 7,678,238 B2
(45) Date of Patent: Mar. 16, 2010

(54) METHOD AND APPARATUS FOR UNDERWATER DECOMPOSITION OF ORGANIC CONTENT OF ELECTRICALLY CONDUCTIVE AQUEOUS WASTE SOLUTIONS

(75) Inventors: István Schremmer, Budapest (HU); Peter Tilky, Paks (HU)

(73) Assignee: G.I.C. KFT, Budapest (HU)

( * ) Notice: Subject to any disclaimer, the term of this patent is extended or adjusted under 35 U.S.C. 154(b) by 1300 days.

(21) Appl. No.: 10/482,960

(22) PCT Filed: Jul. 16, 2002

(86) PCT No.: PCT/HU02/00068

§ 371 (c)(1),
(2), (4) Date: Jun. 21, 2004

(87) PCT Pub. No.: WO03/008340

PCT Pub. Date: Jan. 30, 2003

(65) Prior Publication Data

US 2004/0238456 A1    Dec. 2, 2004

(30) Foreign Application Priority Data

Jul. 17, 2001   (HU)   .................................... 0102986

(51) Int. Cl.
*C02F 1/46* (2006.01)

(52) U.S. Cl. ..................... 204/164; 204/165; 204/275.1; 204/278

(58) Field of Classification Search ................. 204/164, 204/165, 275.1, 278
See application file for complete search history.

(56) References Cited

U.S. PATENT DOCUMENTS 4,582,004 A * 4/1986 Fey et al. ..................... 588/312

5,630,915 A * 5/1997 Greene et al. ............... 204/164

FOREIGN PATENT DOCUMENTS

| EP | 0 659 691 | 6/1995 |
|---|---|---|
| JP | 07068267 | 3/1995 |
| WO | 97 22556 | 6/1997 |
| WO | 99 01382 | 1/1999 |

OTHER PUBLICATIONS

Patent Abstracts of Japan and JPO Computer English translation of JP 07068267 dated Mar. 14, 1995.
Fang, Xingdong, et al., "Research on Treatment of Waste Water by High Voltage Pulse Discharge," *High Voltage Engineering*, vol. 26, No. 1, Feb. 2000, pp. 29-31.
Guo, Xianhui, et al., "Experimental Research on the Treatment of Nitrobenzene Wastewater With Pulse Discharge Plasma," *Electric Power Environmental Protection*, vol. 17, No. 2, Jun. 2001, pp. 37-38.

* cited by examiner

*Primary Examiner*—Arun S Phasge
(74) *Attorney, Agent, or Firm*—Ladas & Parry LLP

(57) ABSTRACT

The object of the present invention is a method and an apparatus for underwater decomposition of organic content of aqueous waste solutions, involving the measurement and, if necessary, adjustment of the pH and electric conductivity of the solution, maintaining optimum pH and/or electric conductivity during the process, and further involving the partial or total decomposition of organic materials contained by the solution. The apparatus comprises a feed tank, at least one decomposition loop, and a storage tank. The method according to the invention is characterized by submerging electrodes in the solution, producing and maintaining an electric arc between the electrodes and the electrically conductive the solution, where the arc is produced by an electric current of at least 0.5 A/cm$^2$ current density at a voltage of at least 70 V and by a symmetrical alternating current having preferably a frequency of at least 10 Hz; and by decomposing the organic content of the solution into water, carbon dioxide, and nitrogen.

20 Claims, 1 Drawing Sheet

METHOD AND APPARATUS FOR UNDERWATER DECOMPOSITION OF ORGANIC CONTENT OF ELECTRICALLY CONDUCTIVE AQUEOUS WASTE SOLUTIONS

TECHNICAL FIELD

The object of the invention is a method and an apparatus for underwater decomposition of organic content of aqueous waste solutions. The method and apparatus can be applied for decomposing various organic materials contained in electrically conductive waste solutions, such as for the decomposition of ethylene-diaminetetraacetatic acid (EDTA), or iron-EDTA (Fe-EDTA). The method and apparatus are particularly applicable for decomposing organic content of radioactive waste solutions, for instance for the treatment of radwaste produced during secondary-loop steam generator decontamination in nuclear power plants.

The treatment of waste solutions containing organic materials, especially the treatment of radioactive waste solutions, poses a crucial problem for environmental protection. Eliminating the EDTA and Fe-EDTA content of the waste solution is particularly difficult. Waste treatment using both known art systems and newly introduced inventive methods is seriously curbed by the EDTA content of liquid radwaste, while EDTA also seriously deteriorates the stability of radwaste already conditioned for final dumping. By destroying the EDTA content of the solution, the volume of the waste solution can be significantly diminished, which considerably decreases the costs of subsequent treatment and storage.

Non-radioactive solutions containing EDTA also require special treatment before releasing them into the environment. That makes the storage of waste solutions of the mentioned kind a costly undertaking that places at the same time a high load on the environment.

BACKGROUND ART

Various solutions are known for decreasing the organic content of aqueous waste solutions.

A method and apparatus for water decontamination is disclosed in U.S. Pat. No. 5,630,915. According to the method an electric arc is produced between electrodes submerged into the liquid. To intensify oxidation, hydrogen peroxide is added to the waste solution in the pretreatment tank. The electrodes are connected to a capacitor that is charged by alternating current having a frequency of 60 Hz. A pulsed electric arc is thus produced between the needle-shaped anode and cathode. Due to the tapered shape of the electrodes the reaction takes place along a very small boundary surface, with the cathode losing its mass quickly; and furthermore, due to the pulsed nature of the electric arcs the method has low capacity. Therefore it can be applied cost-effectively only for treating lower quantities of waste solutions or for decreasing contamination levels thereof to a lesser degree only.

The document WO 99/01382 discloses a method and apparatus applicable for treating flowing contaminated water. According to the method an electrochemical reaction, more specifically, electrolysis is used for water treatment. The apparatus comprises an electrolytic cell comprising inlet and outlet conduits, a current source, a microprocessor control unit, an adjusting means, and a feed pump. The adjusting means is connected to feed pumps that are operated applying signals from sensors continuously measuring the pH and electric conductivity of the water under treatment. Electrodes are submerged into the fluid in the electrolytic cell, with said electrodes being connected to a DC current source with a voltage of 25 V. The applied current density is 67 A/m². As a disadvantage of this method it should be mentioned that not all types of organic material can be decomposed with the method.

Known art treatment methods include, among others, transforming waste solutions into solid material by thermic drying as, for instance, is disclosed by German patent DE 1,639,299. A drawback of this method is its severe cost caused by the high amount of energy needed to vaporise water contained by the solution. Storing the material produced by the process in an environmentally friendly way is costly and involves further difficulties.

Another known art method is the decomposition of organic material using ozone. As disclosed by U.S. Pat. No. 4,761,208, the method involves introducing hydrogen peroxide into the waste solution containing organic materials. The efficiency of the method is, however, rather poor, and, because residual organic radicals cannot be got rid of—not even when the efficiency of ozone decomposition is ameliorated by means of a catalyst—, decomposition is incomplete. An additional drawback of the method is that it is difficult to control.

A further solution for decreasing of organic content from aqueous solutions is biological decomposition. Using this method, however, the EDTA content of the solution cannot be removed, and furthermore, the bactericidity of the solution cannot be reduced.

DISCLOSURE OF THE INVENTION

The object of our invention is to provide a method and apparatus which are capable of reducing, or, under certain conditions, eliminating the organic content of aqueous waste solutions. A further object of the invention is rendering the inventive organic material removal method cost-effective and environmentally friendly at the same time.

The basic insight of our invention is that plasma, produced along electrode surfaces by an electric arc developing between the electrodes and the solution, will carry out thermal decomposition of organic materials, and that free radicals produced by the plasma will oxidise organic materials contained in the solution. Decomposition of organic materials can be enhanced by introducing an oxidising material into the electrode area.

The object of the present invention is a method for underwater decomposition of organic content of aqueous waste solutions, involving the measurement and, if necessary, the adjustment of the pH and/or electric conductivity of the solution, maintaining optimum pH and/or electric conductivity during the process, and further involving the partial or total decomposition of organic materials in the solution. The inventive method is essentially characterised by submerging electrodes into the solution and producing and maintaining an electric arc between the solution and the electrodes submerged in the solution by applying an electric current of at least 0,5 A/cm² current density at a voltage of at least 70 V, preferably by applying symmetrical alternating current having a frequency of at least 10 Hz; and by decomposing the organic content of the solution into water, carbon dioxide, and nitrogen. According to a preferred way of carrying out the method, the pH and/or electric conductivity of the waste solution is adjusted by means of a pre-treatment solution. According to a preferred implementation of the method, sodium hydroxide is added as the pre-treatment solution for adjusting the pH of the waste solution. According to another preferred implementation, the pH of the waste solution containing EDTA is set at a value between 8 and 13. It is also a preferred implementation according to which phosphoric acid is added as the pre-treatment solution used to adjust the pH of the waste solution. According to a further preferred step of implementing the method, sodium sulphate is added as the pre-treatment solution for adjusting the electric conductivity of the waste solution. According to a still further preferred implementation of the method, sodium nitrate is added as the pre-treatment solution for adjusting the pH and the electric conductivity of the waste solution. For enhancing the efficacy of the decomposition of organic content it is favourable to add an oxidiser, preferably hydrogen peroxide to the solution. As an oxidiser, it can also be favourable to add ammonium peroxydisulphate or sodium nitrate to the solution.

A further object of the invention is an apparatus for underwater decomposition of organic content of electrically conductive aqueous waste solutions. The apparatus comprises a feed tank, at least one decomposition loop, and a storage tank. The inventive apparatus is essentially characterised by that it comprises a batch-mode decomposition loop comprising a post-decomposing batch reactor, a buffer tank, and a circulation pump, with the feed tank and a storage tank being connected to said batch-mode decomposition loop through a feed pump. The batch-mode decomposition loop is connected with a pre-treatment solution tank through an adjusting unit and a feed pump, with a splash condenser connected to the post-decomposing batch reactor, where said splash condenser condenses and at least partially recycles the vapours produced therein into said batch reactor. Electrodes are submerged into the waste solution in said batch-mode post-decomposing reactor, with said electrodes being connected to a current source supplying electric current of at least 0,5 A/cm$^2$ current density at a voltage of at least 70 V that is capable of producing and maintaining an electric arc between the waste solution and the submerged electrodes, with said current source producing symmetrical alternating current having a preferably frequency of at least 10 Hz.

According to a preferred embodiment of the apparatus, an oxidiser tank is connected to the batch-mode decomposition loop through a feeder and a feed pump.

Another preferred embodiment of the inventive apparatus is characterised by that it comprises an additional, continuous-flow decomposition loop, with said continuous-flow decomposition loop comprising a main decomposing reactor, a buffer tank, and a circulation pump, where said continuous-flow decomposition loop is situated between the batch-mode decomposition loop and the feed tank so that the continuous-flow decomposition loop is connected to the pretreating solution tank through the adjusting unit, with a splash condenser connected to the main decomposition reactor, where said splash condenser condenses and at least partially recycles the vapours produced therein into said main decomposition reactor, and where electrodes are submerged into the waste solution in said main decomposition reactor, with said electrodes being connected to a current source supplying electric current of at least 0,5 A/cm$^2$ current density at a voltage of at least 70 V that is capable of producing and maintaining an electric arc in the waste solution between the solution and the submerged electrodes, with said current source producing symmetrical alternating current having preferably a frequency of at least 10 Hz. Yet another preferred embodiment of the apparatus is characterised by that an oxidiser tank is connected to the continuous-flow decomposition loop through a feeder and a feed pump.

According to another preferred embodiment, the batch-mode decomposition loop and the continuous-flow decomposition loop comprise filters built therein. Yet another preferred embodiment of the apparatus is characterised by that the electrodes are connected to a current source supplying single-phase alternating current. Still another preferred embodiment of the inventive apparatus is characterised by that the electrodes are connected to a current source supplying three-phase alternating current.

BRIEF DESCRIPTION OF DRAWING

The inventive method will now be exemplified in more detail referring to the attached figures, where.

Figure 1:
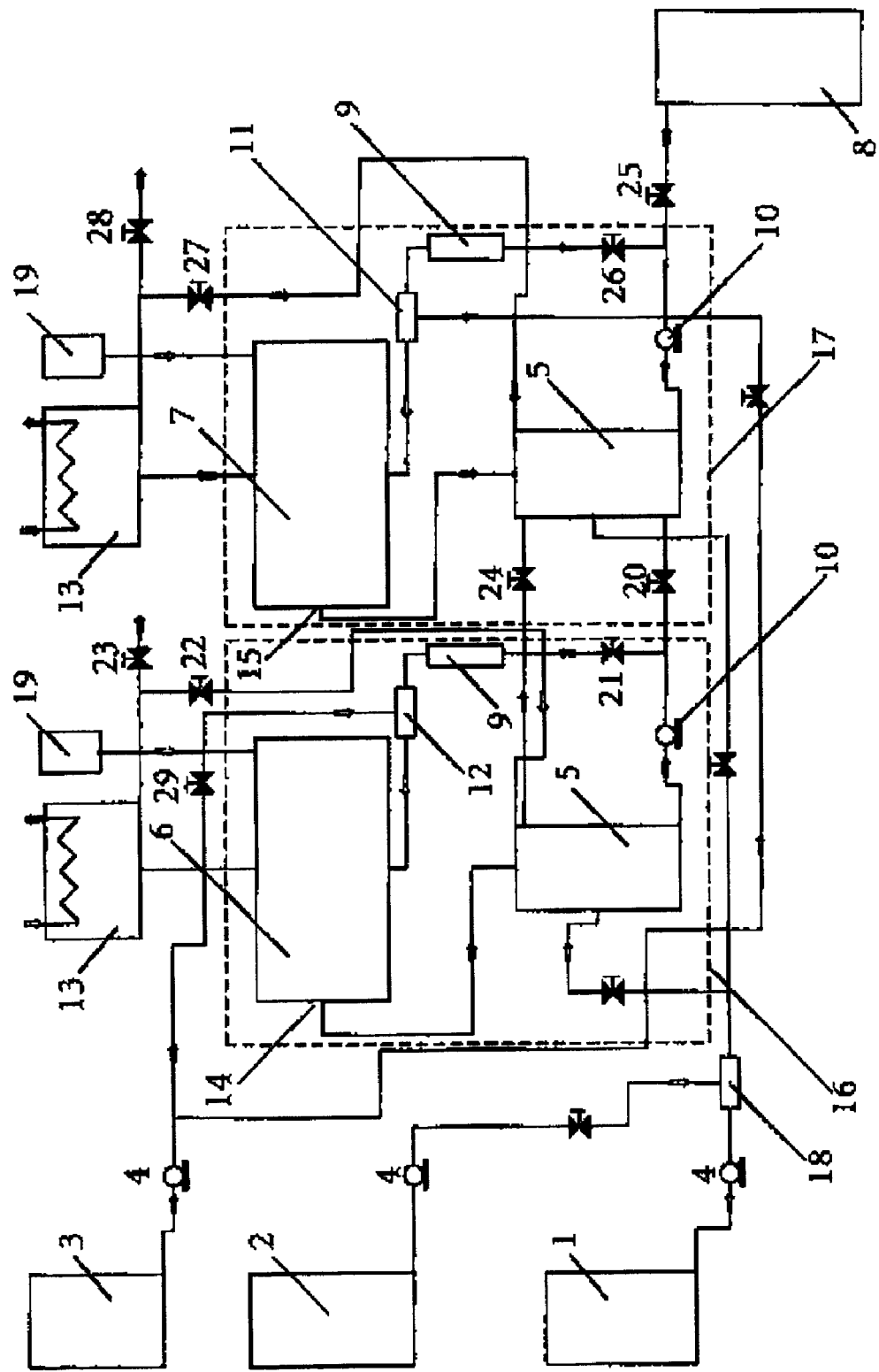
FIG. 1 shows the apparatus according to the invention.

As it has already been mentioned, the method according to the invention is based on destroying organic materials in electrically conductive waste solutions by means of an electric arc produced between submerged electrodes and the solution. Before designing an industrial-scale apparatus, parameters of the process were optimised experimentally. Experiments were carried out for decomposing organic content of an aqueous waste solution containing EDTA, a radioactive aqueous waste solution also containing EDTA, and for destroying the "citrox" content of a waste solution. We have examined the effect of the following parameters:

Electrode properties: material, surface, cross section geometry, relative distance of the electrodes Waste solution properties: initial pH, effect of pH change on EDTA-decomposition rate Other properties: influence of the parameters of the current source on the process.

Experiments were executed in a cooled glass vessel, with the waste solution having the following composition:

| | |
|---|---|
| Fe | 4 g/dm$^3$ |
| EDTA | 21.5 g/dm$^3$ |
| H$_3$BO$_3$ | 32 g/dm$^3$ |
| NH$_4$OH (25%) | 16.5 g/dm$^3$ |
| N$_2$H$_4$ hydrate | 0.25 g/dm$^3$ |

In choosing the appropriate metal for the electrodes, the following requirements were taken into account: acceptable organic decomposition rate in the waste solution, relatively little loss of electrode material in the electric arc, and also that it be sufficiently easy to remove the metal got into the solution from the dissolving electrodes. In the course of the experiments we tested electrodes made of tungsten, copper, titanium, nickel, stainless steel, and unalloyed soft-iron. Experiments were carried out using electrodes with internal water-cooling and without cooling. The effect of cooling could not be detected when applying single-phase alternating current, but when three-phase alternating current was used, cooling prevented the electrodes from overheating.

According to our experiments, W electrodes proved to have the highest dissolution rate. Cu electrodes had average dissolution rate and EDTA-decomposing capability, but it was difficult to precipitate copper from the solution after decomposition had been completed. Ni electrodes showed the best results both for dissolution rate and EDTA-decomposing capability, but, similarly to copper, nickel could only be removed from the solution by adding an extra agent. Ti electrodes dissolved almost as slowly as Ni, but had significantly lower EDTA-decomposing capability. Measured values for stainless steel and unalloyed soft-iron were nearly identical: compared to other electrodes they had satisfactory EDTA-decomposing capability, with electrode dissolution rate remaining considerably low. As a clear advantage of unalloyed soft-iron electrodes it was recorded that the iron that dissolved during the procedure could be precipitated by means of alkalisation as easily as iron initially contained in the waste solution. Iron-hydroxide, present in the solution because of the decomposition of the iron-complex and the dissolution of the electrodes, settled well and could be filtered easily. Table 1 summarises results of EDTA-decomposition rate and relative electrode dissolution rate (destroyed mols of EDTA/dissolved grams of electrode) for each electrode metal.

TABLE 1

| Electrode material | Electrode dissolution rate (EDTA mols destroyed/electrode grams) | EDTA decomposition rate (EDTA mols/hour) |
|---|---|---|
| W | 0.003 | 0.003 |
| Cu | 0.03 | 0.015 |
| Ti | 0.3 | 0.003 |
| Ni | 0.21 | 0.012 |
| stainless steel | 0.04 | 0.007 |
| Fe | 0.032 | 0.006 |

Fe electrodes proved to be the best both in terms of EDTA-decomposition and the subsequent treatment of the waste solution.

The effect of submerged electrode surface was also examined as a function of the effectiveness of EDTA-decomposition. Measurements were carried out in a double-walled glass vessel of a volume of 250 $cm^3$ that was equipped with reflux condenser. In the course of the measurement, two soft-iron electrodes of 6 mm diameter, at a relative distance of 1.5 cm, were gradually submerged into the solution in 0.5 cm steps. The measurement range was 0.5-5 cm. Current, temperature, and arc ignition voltage were measured during continuous operation. As the results show, current increased in linear proportion to submerged electrode surface. At low submerged surface values, an electric arc developed at electrode tips only, which resulted in low current values. Below a current density of 0.5 $A/cm^2$ no electric arc was produced. Submerging more electrode surface into the solution did not strengthen the arc significantly but boiling became more intensive, which caused the arc to be interrupted more frequently and increased coolant demand. Minimal ignition voltage at which the electric arc started to develop was 70 V.

The effect of electrode cross section geometry on the effectiveness of EDTA-decomposition was also studied. We examined electrodes of circular and rectangular cross-sectional geometry at a relative distance of 1.5 cm. The diameter of electrodes with circular cross section was 3 mm, 5 mm, and 7 mm. The experiment resulted in thinner, needle-like electrodes being more effective in EDTA-decomposition. That was the result of a more intensive and better-sustained electric arc developing along their surface. Electrode size selection is, however, affected by other factors as well, such as cost effectiveness, which might make electrodes of greater diameter a preferable choice. Experiments with electrodes of rectangular cross-sectional geometry have yielded similar results, which confirmed that cross-sectional geometry would have relatively minor significance in electrode cross section selection.

Measurements were also carried out for establishing the optimum relative distance of the electrodes. We examined the following distance values: 14 mm, 20 mm, 28 mm, 40 mm, and 60 mm. With increasing electrode distance, current decreased from 7 A to 5.5 A. Also, with the distance of the electrodes increasing, the electric arc shrank: at 60 mm the arc was restricted to electrode tips only.

Our further experiments were performed using optimum parameter values established above. Next we examined the influence of initial pH on EDTA-decomposition rate. Initial pH was first set at 9. Because we observed a decrease of the pH of the solution during decomposition, and simultaneously with it a decrease in EDTA-decomposition rate, we examined how increasing the initial pH would affect the reaction rate. For increasing the pH of the solution, NaOH was used. Results are shown in Table 2.

TABLE 2

| Initial pH | pH after 1 hour of treatment | EDTA concentration after 1 hour of treatment (mol/l) | Removal degree (%) | Electrode weight loss (g/hour) | Ac/Am |
|---|---|---|---|---|---|
| 9 | 7.8 | 0.052 | 30 | 0.379 | 0.058 |
| 10 | 9.2 | 0.040 | 55 | 0.426 | 0.079 |
| 11 | 10.2 | 0.024 | 67 | 0.579 | 0.086 |
| 12 | 10.4 | 0.01 | 87 | 0.658 | 0.097 |
| 13 | 12.52 | 0.012 | 84 | 0.524 | 0.118 |

As the results show, the efficiency of EDTA-decomposition considerably grew with growing initial pH, but parallel with it the dissolution of iron electrodes also duplicated. A somewhat more informative index is the ratio between concentration change and the rate of electrode weight loss (Ac/Am). An increase of this ratio indicates that the system is approaching optimal operating parameters. Maximum efficiency of EDTA-decomposition was reached at pH 13, but to achieve this a too large amount of NaOH had to be added, and the electric arc became so intensive that the process was difficult to control. These factors taken into account, it could be asserted that EDTA-decomposition efficiency was optimal at an initial pH of 12.

As it became obvious during the experiments, changes in solution pH significantly affect the efficiency of EDTA-decomposition. So an important object of the subsequent experiments was examining how the solution pH changes in time. Measurements showed that both EDTA-concentration and the pH changes exponentially in time, and that the two curves are very much alike in shape. Reaction rate significantly increases with increasing initial EDTA concentration and initial pH. From this it can be concluded that in order to control the process in an economical way, the solution should be gradually concentrated with respect to EDTA, and that the solution pH should be gradually increased. Because of the presence of nitrate in the solution, electrode dissolution rate does not increase in time.

In accordance with the present invention, both direct current and alternating current was used for decomposing organic materials from aqueous waste solutions. Experiments were carried out using sinusoidal and square-wave, single-phase and three-phase current sources for producing an electric arc on the electrodes. As simulant we used 300 ml of "citrox", commonly used for decontamination, which had a concentration of 50 g/l of citric acid and 50 g/l of oxalic acid. For adjusting the electric conductivity and the pH of the solution, 0.1 mol/l of sodium nitrate was used. Solution pH was 1,6. The experiment was performed at a current density of 1 $A/cm^2$. Results of the experiment are shown in Table 3., which contains values of decomposition efficiency as a function of time for direct current, 50 Hz sinusoidal-wave alternating current, and 1000 Hz square-wave alternating current.

TABLE 3

| Time (minutes) | Decomposition degree (%) | | |
| --- | --- | --- | --- |
| | DC | 50 Hz (sinusoidal) | 1000 Hz (square wave) |
| 0 | 0 | 0 | 0 |
| 50 | 31.67 | 39.44 | 47.5 |
| 75 | 42.22 | 51.94 | 65.28 |
| 100 | 50.28 | 61.94 | 76.39 |
| 200 | 67.78 | 84.17 | 98.61 |
| 300 | 77.22 | 94.17 | 100.00 |
| 400 | 79.72 | 97.5 | 100.00 |
| 500 | 81.11 | 99.17 | 100.00 |

Experiments showed that, besides having better decomposition efficiency, using alternating current enabled the formation of a more stable and reliable electric arc than that was produced by direct current.

EXAMPLE 1

The method according to the invention was applied for decomposing Fe-EDTA content and other organic materials from waste solutions produced during secondary-loop steam generator decontamination in nuclear power plants. The composition and pH of the solution was as follows:

| | |
| --- | --- |
| Fe-iron ion | 3.8 g/dm$^3$ |
| EDTA | 16.5 g/dm$^3$ |
| $H_3BO_3$ | 23 g/dm$^3$ |
| $Na^+$ | 4.22 g/dm$^3$ |
| $K^+$ | 0.35 g/dm$^3$ |
| $NO_3^-$ | 3.64 g/dm$^3$ |
| Density | 1.025 g/dm$^3$ |
| Solid content | 56.04 g/dm$^3$ |
| pH | 9.10 |

Activity Concentration

| | |
| --- | --- |
| $^{51}Cr$ | <2543 Bq/dm$^3$ |
| $^{54}Mn$ | 58500 Bq/dm$^3$ |
| $^{59}Fe$ | <846 Bq/dm$^3$ |
| $^{58}Co$ | 54100 Bq/dm$^3$ |
| $^{134}Cs$ | 18100 Bq/dm$^3$ |
| $^{137}Cs$ | 34900 Bq/dm$^3$ |
| $^{110m}Ag$ | 3450 Bq/dm$^3$ |

The experiments were carried out in two thermostated glass vessels, having a volume of 220 cm$^3$ and 1200 cm$^3$. The applied voltage was 220 V/50 Hz, the current range was 5-8 A, and the temperature range was 90-95° C. Soft iron electrodes used for the experiment had a diameter of 7 mm, with a submerging depth of 2 cm. The distance of the electrodes was 2 cm in the smaller vessel, and 4 cm in the larger one. Nominal voltage was gradually applied to the electrodes using a toroid transformer. Changes in EDTA content were detected by means of zirconium oxychloride titration. The rate of EDTA-decomposition was examined in the original solution as well as after the initial concentration of the solution had been tripled, and in the original solution after the pH had been increased. Results of the experiments are summarised in Table 4.

TABLE 4

| Experiment No. | $V_0$ (cm$^3$) | $pH_0$ | $C^0_{EDTA}$ (mol/dm$^3$) | $C^V_{EDTA}$ (mol/dm$^3$) | EDTA decomposition rate (mmol/hour) | Energy demand (kWh/dm$^3$) |
| --- | --- | --- | --- | --- | --- | --- |
| 1 | 220 | 9.1 | 0.057 | 0.0162 | 2.2 | 22.5 |
| 2 | 1200 | 9.1 | 0.057 | 0.0258 | 3.7 | 15.8 |
| 3 | 220 | 9.2 | 0.143 | 0.0150 | 4.7 | 42.3 |
| 4 | 1200 | 12.3 | 0.057 | 0.0156 | 6.2 | 13.5 |

Comparing experiments 1 and 3 it can be clearly seen that the efficiency of EDTA-decomposition is greater in a more concentrated solution. In a solution with threefold concentration the rate of EDTA decomposition was more than doubled. From the comparison of the results yielded by experiments 1 and 2 it can be ascertained that greater EDTA quantity involves greater efficiency for EDTA decomposition. By quintupling the volume of the solution the rate of EDTA decomposition increased to 1.7 times of the original (with pH remaining constant). Based on experiments 2 and 4 it can be stated that EDTA decomposition is more efficient in alkaline environment. Increasing the pH of the solution from 9.1 to 12.3 resulted in an almost doubled EDTA decomposition rate.

Measurements of solution activity indicated that during the decomposition of the Fe-EDTA complex, as a result of pH adjustment and the addition of hydrogen peroxide, part of the manganese content and virtually all of the silver content of the solution precipitated together with the iron hydroxide. The concentration of high-activity isotopes ($^{134}Cs$, $^{137}Cs$, $^{58}Co$, $^{60}Co$) remained practically constant.

EXAMPLE 2

After the laboratory-scale experiments had been completed, we examined properties of EDTA decomposition using a larger apparatus, with the aim of gathering additional data for designing an industrial-scale complex apparatus for decomposition of organic content.

For higher EDTA-decomposition efficiency, the number of electrodes was increased. This resulted in the production of a more uniform electric field, and enabled us to increase the voltage applied to the electrodes. The increased current drain of the system called for the application of a three-phase system to achieve a more even mains load. The system included a buffer tank connected to the 2 dm$^3$ reactor. The solution was circulated from the buffer tank to the reactor and back through a pre-cooling unit, using a centrifugal pump. Before entering the reactor, hydrogen peroxide was added to the circulated solution. Solution volume was kept constant by means of a reflux condenser connected to the reactor.

During the process, a square grid of 9 electrodes was applied, with 3 electrodes connected to each mains phase. Distance between neighbouring electrodes was 4 cm. As the neighbouring electrodes were connected to different mains phases, the voltage between the electrodes was maximal. The composition of the test solution was identical to that used in Example 1. Initial $pH_0$ was 9.0. During stationary operation the temperature was 97° C., with the current per electrode being 9-10 A, and the current per mains phase 27-30 A. Hydrogen peroxide solution with a concentration of 30% was fed at a rate of 20 cm³/hour. The results of the experiment are shown in Table 5.

TABLE 5

| $V_0$ (cm³) | $pH^0$ | $PH^F$ | $C^0_{EDTA}$ (mol/dm³) | $C^F_{EDTA}$ (mol/dm³) | EDTA decomposition rate (mmol/hour) | Energy demand (kWh/dm³) |
|---|---|---|---|---|---|---|
| 4 | 9.0 | 9.5 | 0.083 | 0.008 | 60 | 24.8 |

Comparing the results of the scaled up experiment to the results yielded by the lab-scale one, it can be concluded that both the energy demand of the decomposition and the final EDTA concentration ($C^F_{EDTA}$) are significantly lower in the experiment where three-phase current and hydrogen peroxide injection was applied than in the lab-scale experiment of the same length of time. The experiments indicated that the specific energy demand of the EDTA decomposition decreases with increasing waste solution volume that is increased EDTA quantity.

EXAMPLE 3

Based on the results of laboratory experiments, decomposition of organic materials in 450 m³ of waste solution was carried out in two stages, using the apparatus shown in FIG. 1. In the first stage the solution was concentrated and main EDTA decomposition was performed. A limit on further concentrating the solution was placed by boric acid content. EDTA decomposition was intensified by adding hydrogen peroxide. In the first stage, 70-75% of the original EDTA content was removed using a continuous-flow decomposing reactor.

In the second stage a batch reactor was used for EDTA decomposition, with a final EDTA-removal degree of 96.5%. EDTA decomposition rate in the second loop was enhanced by feeding NaOH into the buffer tank.

Iron hydroxide slurry, precipitating during EDTA decomposition was removed by means of a centrifuge.

Parameters used during EDTA decomposition:

| | |
|---|---|
| Voltage | 380 V |
| Current | 3 × 350 A |
| Treatment time | 4000 hours |
| Energy demand | 1-1.2 GWh |
| Iron electrode loss | 600-800 kg |
| NaOH | 5000-5500 kg |
| $H_2O_2$ | 10-12 m³ |

The apparatus for carrying out the method according to the invention can be seen in FIG. 1.

The apparatus comprises a continuous-flow decomposition loop 16 and a batch-mode decomposition loop 17. In the continuous-flow decomposition loop 16, the main decomposing reactor 6, a buffer tank 5, a filter 9, a feeder 12, and a circulation pump 10 are connected with each other by means of conduits. The buffer tank 5 of the continuous-flow decomposition loop 16 is connected with the feed tank 1 through an adjusting unit 18 and a feed pump 4. The pretreating solution tank 2 is joined to the adjusting unit 18 also through a feed pump. The feeder 12 of the continuous-flow decomposition loop 16 is connected with an oxidiser tank 3 through a feed pump 4. The electrodes are submerged into the main decomposing reactor 6 being equipped with an overflow 14. The interior of the main decomposing reactor 6 is connected to a condenser 13. Water condensed in the condenser 13 can be drained, or alternatively, recycled to the buffer tank 5. Electrodes of the main decomposing reactor 6 are connected to a current source supplying symmetrical alternating current.

The configuration of the batch-mode decomposition loop 17 is identical with that of the continuous-flow decomposition loop 16. The batch-mode decomposition loop 17 comprises a post-decomposing batch reactor 7, a buffer tank 5, a filter 9, and a feeder 11, and it is connected with the storage tank 8 via a conduit. The buffer tank 5 of the batch-mode decomposition loop 17 is connected with the buffer tank 5 of the continuous-flow decomposition loop 16, whereas the feeder 11 of said batch-mode decomposition loop 17 is connected with the oxidiser tank 3 through a feed pump 4. A condenser 13 is connected to the batch reactor 7, with the water condensed therein being partially or entirely recycled to said batch reactor 7.

Operation of the inventive apparatus will now be exemplified in greater detail.

The solution to be treated is fed from a waste solution tank to the feed tank 1 by an batch-operation feeding pump. The feeding pump is operated by a level detector that prevents the feed tank 1 from being overfilled or drained. Once the waste solution is fed into the feed tank 1, a feeding pump 4 feeds it into the adjusting unit 18, where the pH and electric conductivity of the solution are adjusted to experimentally determined optimum values by means of adding a pretreating solution fed from the pretreating solution tank 2 by a feed pump 4. As pretreating solution, sodium hydroxide, potassium hydroxide, or lithium hydroxide can be used. The pretreated solution is then fed into the buffer tank 5 of the continuous-flow decomposition loop 16. Fluid volume entering the buffer tank 5 is adjusted using a known art measurement and control system. The solution is now fed, with valve 20 shut and valve 21 open, into the feeder 12 by a circulation pump 10 through a filter 9. The filter 9 performs the removal of solid material that the solution initially contained or has been produced during the adjustment of the pH and/or electric conductivity of the solution. In the feeder 12, oxidiser is fed to the solution at a specified dosing rate, with the exact rate established in earlier experiments. Oxidiser can be either organic or inorganic, as well as, the combination thereof. Aqueous solution of hydrogen peroxide, ammonium peroxydisulphate, sodium hypochlorite, benzoyl peroxide or their mixture can be used as oxidiser. Decomposition of the organic content can also be carried out without an oxidiser.

When the solution leaves the feeder 12, the circulation pump 10 feeds the it into the main decomposing reactor 6. In the main decomposing reactor 6, electrodes are submerged into the solution, with the electrodes being connected to a current source 19. Heated by the current the solution reaches optimum temperature in the main decomposing reactor 6, and an electric arc develops between the electrodes and the solution. The solution can of course be preheated by other means. The electric arc produced between the solution and the electrodes decomposes the organic content of the waste solution, and causes the fluid to boil. Water vapour produced in the reactor is fed into the condenser 13, where it is cooled. The condensed water is then partially or entirely recycled to the main decomposing reactor 6. The percentage of water to be recycled can be adjusted by setting the degree of the relative opening of valves 22 and 23. By decreasing recycled condense water percentage even to zero, optimum organic concentration can be set for the solution.

The waste solution is continuously circulated in the continuous-low decomposition loop 16 by means of the circulation pump 10 so that the solution is fed through the overflow 14 of the main decomposing reactor 6 into the buffer tank 5. The solution level in the buffer tank 5 is set by adjusting the ratio of fluid feeding and draining, or back feeding the condensate to achieve a stationary, optimum concentration in the system. The solution has optimum concentration if its mass flow equals the difference of mass flows fed into and drained from the tank.

When optimum concentration is achieved, the solution is fed into the batch-mode decomposition loop 17 through the overflow pipe of the buffer tank 5 after valve 24 has been opened. In the batch-mode decomposition loop 17 the waste solution is fed into the post-decomposing batch reactor 7 through a filter 9 and a feeder 11, by circulating pump 10, while valve 25 is shut and valve 26 is open. The role of the filter 9 and the feeder 11 is identical with that of their counterparts in the continuous-flow decomposition loop. The waste solution flows back into the buffer tank 5 from the batch reactor 7 through an overflow 15. The process is started in the batch-mode decomposition loop 17 as soon as the buffer tank 5 of said batch-mode decomposition loop 17 is filled up through the overflow pipe 14 of the continuous-flow decomposition loop 16.

The post-decomposing batch reactor 7, as well as its electrodes and current source, are identical in structure to those of the main decomposing reactor 6. The electric arc produced between the submerged electrodes and the waste solution in the batch reactor 7 decomposes the residual organic content of the solution and causes the fluid to boil. Water vapour produced in the reactor is cooled in a condenser 13. The condensed water is partially recycled through valve 27, while the remainder is drained through valve 28. In the batch reactor 7 the decomposition of organic materials is carried out at optimum organic concentration. In order that organic concentration is kept constant, as organic materials decomposition is proceeding and the quantity of organic materials is decreasing, the quantity of water is also decreased by draining part of the condensed water from the system.

The batch-mode loop is operated until the desired extent of organic decomposition is achieved. Experiments show that in the continuous-flow decomposition loop 16 an organic decomposition degree of 70-75% can be reached, while in the batch loop it increases to 96.5%. Efficiency of the process can be further increased by prolonged operation.

Alternatively, the process can be carried out by circulating the waste solution only in a single decomposition loop (the batch loop). A single-loop process can be used primarily for decomposition of organic content from waste solutions not containing EDTA. In that case, the efficiency of organic material decomposition will be lower.

| List of references |
|---|
| 1 feed tank |
| 2 pretreating solution tank |
| 3 oxidiser tank |
| 4 feed pump |
| 5 buffer tank |
| 6 main decomposing reactor |
| 7 batch reactor |
| 8 storage tank |
| 9 filter |
| 10 circulation pump |
| 11 feeder |
| 12 feeder |
| 13 condenser |
| 14 overflow pipe |
| 15 overflow pipe |
| 16 continuous-flow decomposition loop |
| 17 batch-mode decomposition loop |
| 18 adjusting unit |
| 19 current source |
| 20 valve |
| 21 valve |
| 22 valve |
| 23 valve |
| 24 valve |
| 25 valve |
| 26 valve |
| 27 valve |
| 28 valve |

The invention claimed is:

1. A method for underwater decomposition of organic content of aqueous waste solutions, involving the measurement and, if necessary, the adjustment by means of a pretreating solution of the pH and electric conductivity of the solution, maintaining optimum pH and/or electric conductivity during the process, and further involving the total or partial decomposition of organic content of the solution, comprising:

submerging electrodes including a working electrode and an auxiliary electrode into the solution, and producing and maintaining an electric arc between the electrodes and the electrically conductive solution by applying electric current of at least 0.5 A/cm$^2$ current density at a voltage of at least 70 V, and applying symmetrical alternating current having a frequency of at least 10 Hz; and decomposing the organic content of the solution into water, carbon dioxide, and nitrogen, wherein the total surface area of the working electrode is smaller than the total surface area of the auxiliary electrode, and plasma is generated close to the working electrode where the current density is higher.

2. The method according to claim 1, wherein sodium hydroxide is added as a pretreating solution for adjusting the pH of the waste solution.

3. The method according to claim 2, wherein an oxidizer is added to the waste solution for fostering the decomposition of organic materials.

4. The method according to claim 2, wherein the pH of the waste solution containing EDTA is set at a value between 8 and 13.

5. The method according to claim 4, wherein an oxidizer is added to the waste solution for fostering the decomposition of organic materials.

6. The method according to claim 1, wherein phosphoric acid is added as a pretreating solution used to adjust the pH of the waste solution.

7. The method according to claim 6, wherein an oxidizer is added to the waste solution for fostering the decomposition of organic materials.

8. The method according to claim 1, wherein sodium sulphate is added as a pretreating solution for adjusting the electric conductivity of the waste solution.

9. The method according to claim 8, wherein an oxidizer is added to the waste solution for fostering the decomposition of organic materials.

10. The method according to claim 1, wherein sodium nitrate is added as a pretreating solution for adjusting the pH and the electric conductivity of the waste solution.

11. The method according to claim 1, wherein an oxidizer is added to the waste solution for fostering the decomposition of organic materials.

12. The method according to claim 11, wherein hydrogen peroxide is added as an oxidizer.

13. The method according to claim 11, wherein ammonium peroxydisulphate or sodium nitrate is added as an oxidizer.

14. An apparatus for underwater decomposition of organic content of electrically conductive aqueous waste solutions, comprising a feed tank, at least one decomposition loop, and a storage tank, the feed tank and the storage tank being connected to said decomposition loop through a feed pump, and the decomposition loop being connected with a pretreating solution tank through an adjusting unit and a feed pump; and the decomposition loop comprising electrodes being submerged into the waste solution, wherein said electrodes are connected to a current source, and comprising a batch-mode decomposition loop comprising a post-decomposing batch reactor, a buffer tank, and a circulation pump, with a splash condenser connected to the batch reactor, wherein said splash condenser condenses and at least partially recycles into said batch reactor vapors produced therein, and with electrodes being submerged into the waste solution in said batch reactor, wherein said electrodes are connected to a current source supplying electric current of at least 0.5 A/cm$^2$ current density at a voltage of at least 70 V that is capable of producing and maintaining an electric arc between the electrodes and the waste solution, with said current source producing symmetrical alternating current having a frequency of at least 10 Hz.

15. The apparatus according to claim 14, wherein an oxidizer tank is connected to the batch-mode decomposition loop through a feeder and a feed pump.

16. The apparatus according to claim 15, further comprising an additional, continuous-flow decomposition loop, with said continuous-flow decomposition loop comprising a main decomposing reactor, a buffer tank, and a circulation pump, wherein said continuous-flow decomposition loop is situated between the batch-mode decomposition loop and the feed tank so that the continuous-flow decomposition loop is connected to the pretreating solution tank through the adjusting means, with a splash condenser connected to the main decomposition reactor, wherein said splash condenser condenses and at least partially recycles into said main decomposition reactor vapors produced therein, and wherein electrodes are submerged into the waste solution in said main decomposition reactor, with said electrodes being connected to a current source (19) supplying electric current of at least 0.5 A/cm$^2$ current density at a voltage of at least 70 V that is capable of producing and maintaining an electric arc between the electrodes and the waste solution, with said current source producing symmetrical alternating current having a frequency of at least 10 Hz.

17. The apparatus according to claim 16, wherein an oxidizer tank is connected to the continuous-flow decomposition loop through a feeder and a feed pump.

18. The apparatus according to claim 14, wherein at least one of the batch-mode decomposition loop and the continuous-flow decomposition loop comprises a filter built therein.

19. The apparatus according to claim 14, wherein the electrodes are connected to a current source supplying single-phase alternating current.

20. The apparatus according to claim 14, wherein the electrodes are connected to a current source supplying three-phase alternating current.

* * * * *